(12) United States Patent
Minamisawa et al.

(10) Patent No.: US 10,976,640 B2
(45) Date of Patent: *Apr. 13, 2021

(54) OPTICAL UNIT WITH SHAKE CORRECTION FUNCTION

(71) Applicant: NIDEC SANKYO CORPORATION, Suwa-gun Nagano (JP)

(72) Inventors: Shinji Minamisawa, Suwa-gun Nagano (JP); Takeshi Sue, Suwa-gun Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 213 days.

This patent is subject to a terminal disclaimer.

(21) Appl. No.: 15/940,021

(22) Filed: Mar. 29, 2018

(65) Prior Publication Data

US 2018/0284567 A1 Oct. 4, 2018

(30) Foreign Application Priority Data

Mar. 30, 2017 (JP) .............................. JP2017-066742

(51) Int. Cl.
*G02B 7/02* (2006.01)
*G03B 5/00* (2021.01)

(52) U.S. Cl.
CPC ................. *G03B 5/00* (2013.01); *G02B 7/02* (2013.01); *G03B 2205/0023* (2013.01); *G03B 2205/0069* (2013.01)

(58) Field of Classification Search
CPC ........ G02B 27/64; G02B 27/646; G02B 7/02; G02B 7/04; G03B 5/06; G03B 2205/0023; G03B 2205/0069; G03B 5/00; H04N 5/225; H04N 5/2254; H04N 5/232; H04N 5/23287
USPC ................................... 359/813–824
See application file for complete search history.

(56) References Cited

U.S. PATENT DOCUMENTS

| 2013/0136437 A1* | 5/2013 | Asakawa ................. G03B 5/00 396/55 |
| 2014/0119717 A1* | 5/2014 | Yasuda ................ G02B 27/646 396/55 |
| 2015/0370033 A1* | 12/2015 | Song ....................... H02K 7/00 359/824 |

(Continued)

FOREIGN PATENT DOCUMENTS

JP 2009150929 A 7/2009
JP 2013246414 A 12/2013

*Primary Examiner* — Thong Q Nguyen
(74) *Attorney, Agent, or Firm* — Cantor Colburn LLP

(57) ABSTRACT

An optical unit with shake correction function may have a movable member configured hold an optical element; a holder configured to support the movable member on an inner circumferential side via a swingable supporting mechanism; a first rotation supporting mechanism configured to rotatably support the holder at a periphery of an axis; and a fixing member configured to support the holder via the first rotation supporting mechanism. The fixing member may include a fixing member side opposing part that opposes to the holder in a Z axis direction (direction of the axis), and the holder may include a holder side opposing part that opposes to the fixing member side opposing part in the Z axis direction. The first rotation supporting mechanism may include a plurality of balls between the fixing member side opposing part and the holder side opposing par.

11 Claims, 11 Drawing Sheets

(56) References Cited

U.S. PATENT DOCUMENTS

2018/0284566 A1\* 10/2018 Minamisawa ..... H04N 5/23287

\* cited by examiner

FIG. 8
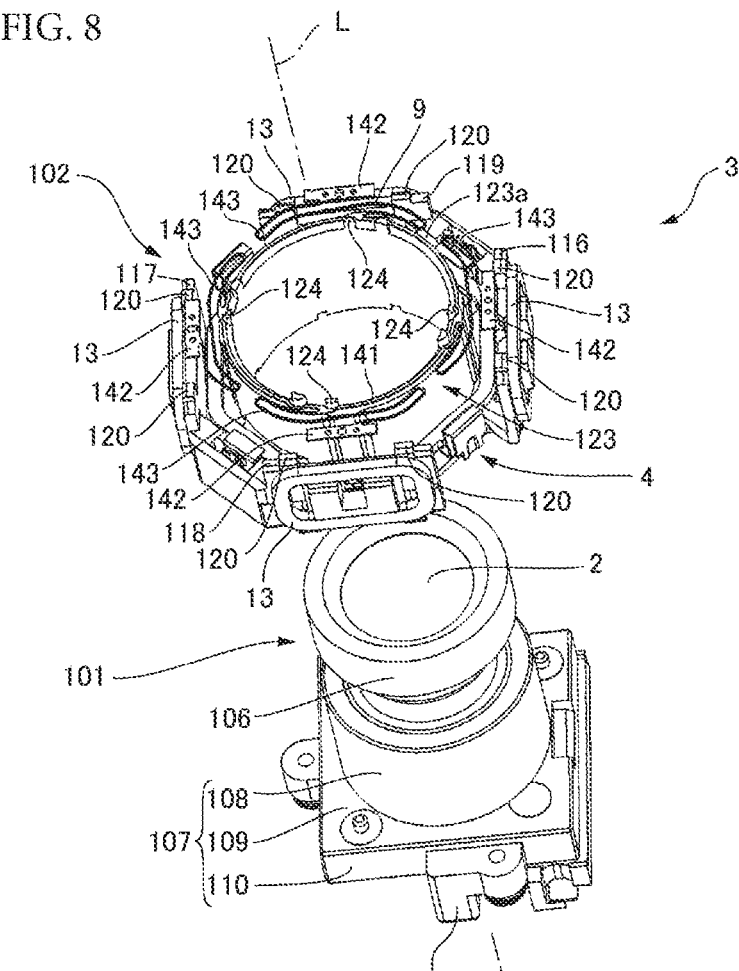
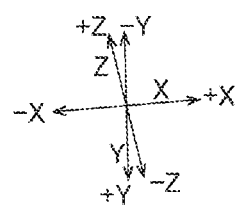

FIG. 10
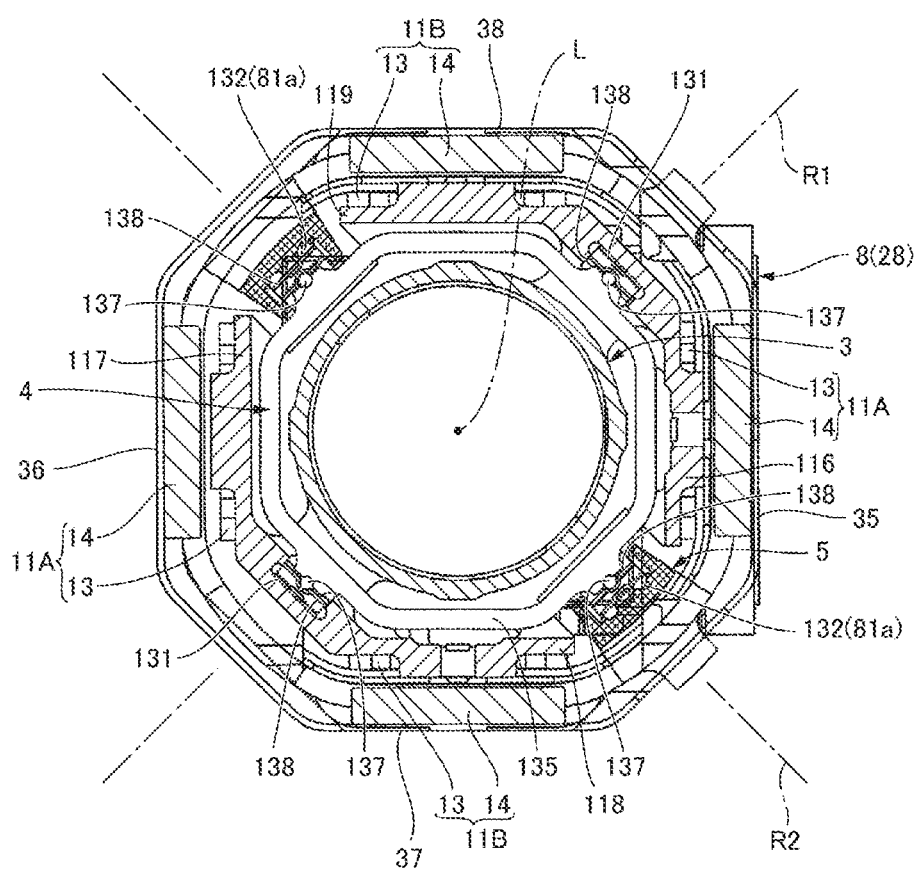
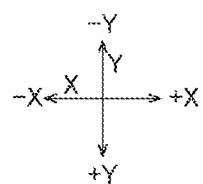

FIG. 11A
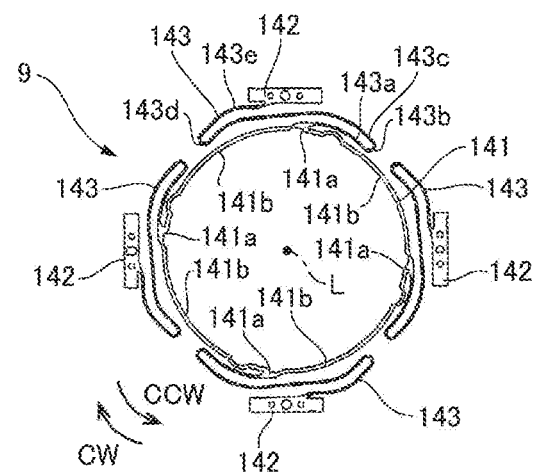
FIG. 11B
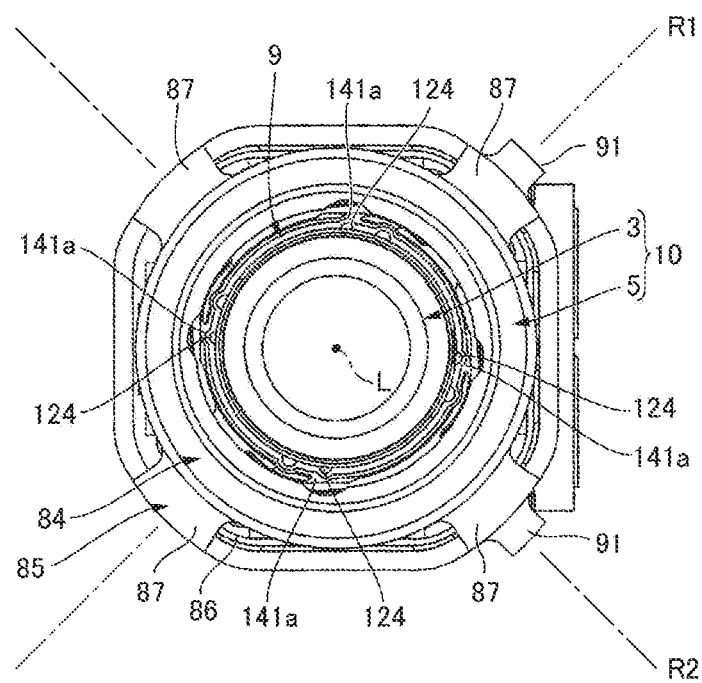
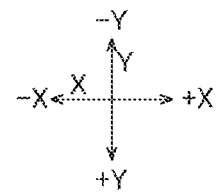

OPTICAL UNIT WITH SHAKE CORRECTION FUNCTION

CROSS REFERENCE TO RELATED APPLICATION

The present application claims priority under 35 U.S.C. § 119 to Japanese Application No. 2017-066742 filed Mar. 30, 2017, the entire content of which is incorporated herein by reference.

BACKGROUND

Field of the Invention

At least an embodiment of the present invention relates to an optical unit with shake correction function that is incorporated in a handheld terminal or a mobile object and a method for manufacturing the optical unit with shake correction function.

Description of the Related Documents

An image pickup device mounted on a mobile object such as a handheld terminal, a vehicle, or an unmanned helicopter is provided with an optical unit having mounted an optical module for image acquisition thereon. The optical unit of such a type is required to restrict distortion of a picked up image exerted by vibration of the image pickup device. Therefore, as the optical unit, there has been proposed an optical unit with shake correction function provided with: a swingable supporting mechanism configured to swingably support an optical module; and a rotation supporting mechanism configured to rotatably support the optical module at the periphery of an optical axis in such a manner that the optical module is swung by a magnetic driving mechanism for swing in a pitching (longitudinal swing: tilting) and a yawing (transverse swing: panning) direction crossing the optical axis, and the optical module is rotated at the periphery of the optical axis by a magnetic driving mechanism for rolling.

In Japanese Unexamined Patent Application Publication No. 2009-150929 and Japanese Unexamined Patent Application Publication No. 2013-246414, there is described a rotation supporting mechanism configured to rotatably support an optical module at the periphery of an optical axis. In these documents, the optical module is supported by a supporting member surrounding the optical module in a radial direction that is orthogonal to the optical axis, and the rotation supporting mechanism is provided with a ball that rolls between the optical module and the supporting member.

In the rotation supporting mechanisms of Japanese Unexamined Patent Application Publication No. 2009-150929 and Japanese Unexamined Patent Application Publication No. 2013-246414, the ball is positioned outside in the radial direction of the optical module and thus there has been a problem that the rotation supporting mechanism in the radial direction cannot be easily downsized.

At least an embodiment of the present invention has been made in view of the problem described above, and at least an embodiment of the present invention provides an optical unit with shake correction function which is capable of easily downsizing a rotation supporting mechanism configured to rotatably support an optical module in a radial direction.

SUMMARY

In order to solve the problem described above, at least an embodiment of the present invention takes technical means as summarized below.

In other words, according to at least an embodiment of the present invention, there is provided an optical unit with shake correction function including: an optical module configured to hold an optical element; a swingable supporting mechanism configured to swingably support the optical module between a reference posture in which a preset axis and an optical axis are coincident with each other; a supporting member configured to support the optical module on an inner circumferential side via the swingable supporting mechanism; a rotation supporting mechanism configured to rotatably support the supporting member at a periphery of the axis; a fixing member configured to support the supporting member via the rotation supporting mechanism; a magnetic driving mechanism for swing configured to swing the optical module; and a magnetic driving mechanism for rolling configured to rotate the supporting member, wherein the fixing member comprises a fixing member side opposing part that opposes the supporting member in a direction of the axis, the supporting member comprises a supporting member side opposing part that opposes the fixing member side opposing part in the direction of the axis, and the rotation supporting mechanism comprises a plurality of rolling members between the fixing member side opposing part and the supporting member side opposing part.

According to at least an embodiment of the present invention, the rotation supporting mechanism is provided with the plurality of rolling members between the fixing member side opposing part and the supporting member side opposing part that oppose in the direction of the axis. Therefore, the rotation supporting mechanism can be easily downsized in the radial direction in comparison with the case in which the rolling members are positioned on the outer circumferential side of the supporting member configured to support the optical module. Accordingly, the optical unit with shake correction function can be easily downsized in the radial direction.

According to at least an embodiment of the present invention, it is desirable that the fixing member side opposing part be formed in an annular shape and be positioned at the outer circumferential side of the optical module; the fixing member side opposing part be provided with a fixing member side annular groove that surrounds the axis; the supporting member side opposing part be provided with a supporting member side annular groove that opposes to the fixing member side annular groove; and the rolling members be inserted into the fixing member side annular groove and the supporting member side annular groove. In this manner, the balls can be held between the fixing member side opposing part and the supporting member side opposing part. In addition, the rolling members roll in the fixing member side annular groove and the supporting member side annular groove and then can move in the circumferential direction and thus the optical module rotates smoothly.

According to at least an embodiment of the present invention, it is desirable that the rotation supporting mechanism be provided with an annular retainer that surrounds the axis between the fixing member side opposing part and the supporting member side opposing part; the retainer has a plurality of through holes that are arranged in the circumferential direction; and a respective one of the plurality of rolling members be inserted into a respective one of the plurality of through holes. In this manner, the rolling members do not slip from a gap between the fixing member side opposing part and the supporting member side opposing part. In addition, gaps between the rolling members in the circumferential direction can be stably maintained.

According to at least an embodiment of the present invention, it is desirable that the retainer be provided with: a first projection part that projects toward the fixing member side opposing part between two of the through holes that are respectively adjacent to each other in the circumferential direction; and a second projection part that projects toward the supporting member side opposing part, the first projection part be capable of coming into sliding contact with an edge portion of the fixing member side annular groove in the fixing member side opposing par, and the second projection part be capable of coming into sliding contact with an edge portion of the supporting member side annular groove in the supporting member side opposing part. In this manner, the posture of the retainer can be easily maintained.

According to at least an embodiment of the present invention, it is desirable that the retainer have cutout parts in two spaced locations of an outer circumferential edge. In this manner, the retainer is held via the cutout parts by way of a jig or the like, and the posture (angular location) of the retainer at the periphery of the axis can be established. Therefore, rolling members such as balls can be easily disposed in the through holes of the retainer.

According to at least an embodiment of the present invention, it is desirable that lubricating oil is applied to inner circumferential faces of the fixing member side annular groove and the supporting member side annular groove; at either one of an edge portion on an inner circumferential side more significantly than the fixing member side annular groove in the fixing member side opposing part and an edge portion on an inner circumferential side than the fixing member side annular groove in the fixing member side opposing part, an annular projection parts that projects toward the other one be provided; in the other one, an annular stepped part that receives a tip end portion of the annular projection part be provided; and the annular stepped part be provided with: an annular radial opposing face that opposes from the outer circumferential side at a tip end portion of the annular projection part and, an annular axial opposing face that opposes in the direction of the axis to the tip end portion of the annular projection part. As long as lubricating oil is applied to the inner circumferential faces of the fixing member side annular groove and the supporting member side annular groove, the optical module rotates smoothly relative to the supporting member. A Labyrinth seal can also be configured with the annular projection part that is provided in either one of the fixing member side opposing part and the supporting member side opposing part and the stepped part provided in the other one, so that the outflow of the lubricating can be prevented or restricted. In addition, the Labyrinth seals can be configured with the annular projection part that is provided in either one of the fixing member side opposing part and the supporting member side opposing part and the stepped part provided in the other one, so that entry of dust can be prevented or restricted between the fixing member side opposing part and the supporting member side opposing part where the balls roll.

According to at least an embodiment of the present invention, it is desirable that the optical module be provided with a mirror cylinder configured to hold the optical element; an end on the object side of the mirror cylinder be positioned on the side of the fixing member side opposing part more significantly than the supporting member side opposing part in the direction of the axis; the annular projection part project from the fixing member side opposing part toward the support member side opposing part; and the annular stepped part be provided in the supporting member side opposing part. In this manner, the Labyrinth seal is provided in a spaced location from an end of the object side of the mirror cylinder and thus even in a case where volatile gas of the lubricating oil flows out via the Labyrinth seal, it may be possible to restrict an adverse influence on the optical element.

According to at least an embodiment of the present invention, in order to rotate the optical module, it is desirable that the magnetic driving mechanism for rolling be provided with; a rolling driving magnet that id disposed in either one of the supporting member and the fixing member; and a rolling driving coil that is disposed in the other one, the rolling driving coil opposing to the rolling driving magnet.

In this case, the rolling driving magnet and the rolling driving coil can be caused to respectively oppose to each other in the direction of the axis.

Alternatively, the rolling driving magnet and the rolling driving coil can be caused to respectively oppose to each other in a direction crossing the axis.

According to at least an embodiment of the present invention, it is desirable that the rotation supporting mechanism and a second rotation supporting mechanism configured to rotatably support the supporting member at the periphery of the axis in a location that is spaced in the direction of the axis be provided; the fixing member be provided with: a fixing member main body provided with the fixing member side opposing part; a spring member that is fixed to the fixing member main body; and a movable holder that is supported by the fixing member main body via the spring member, the movable holder being movable in the direction of the axis; the movable holder oppose to the supporting member from the opposite side to the fixing member side opposing part; the supporting member be provided with a second supporting member side opposing part that opposes to the movable holder; the second rotation supporting mechanism be provide with an inner ring that is coaxial to the axis, the inner ring being supported by the supporting member; an outer ring that is disposed at the outer circumferential side of the inner ring, the outer ring being held by the holder; and a ball rolling between the inner ring and the outer ring; the spring member bias the movable holder toward the second supporting member side opposing part and cause the outer ring to abut against the second supporting member side opposing part and bias the supporting member toward the fixing member side opposing part via the movable holder and the outer ring. In this manner, the supporting member is supported by two rotation supporting mechanisms and thus a rotary shaft of the supporting member does not vibrate. In addition, the spring member applies a given pressure that is oriented to the second supporting member side opposing part to the outer ring of the second rotation supporting mechanism via the movable holder. Therefore, the supporting member is reliably supported by the second rotation supporting mechanism, and axis of rotation of the supporting member can be stabilized. Further, the spring member biases the supporting member toward the fixing member side opposing part via the movable holder and the outer ring. In this manner, the supporting member side opposing part is biased toward the fixing member side opposing part, and the given pressure is applied to the second rotation supporting mechanism. Therefore, the supporting member is reliably supported by the rotation supporting mechanism, and rotation of the supporting member can be stabilized.

According to at least an embodiment of the present invention, it is desirable that the fixing member side opposing part and the supporting member side opposing part be made of a same resin material. If these opposing parts are formed of the resin material, they can be reduced in weight in comparison with a case in which these opposing parts are made of a metal material. In addition, if these opposing parts are formed of a same resin material, fixing member side opposing part and the supporting member side opposing part has the same thermal expansion rate and thus even in a case where an optical unit with shake correction function has been operated under a temperature changing environment, it may be possible to prevent unstable rotation of the supporting member.

With an optical unit with shake correction function according to at least an embodiment of the present invention, a rotation supporting mechanism for rotatably supporting an optical module by a supporting member is provided with a plurality of rolling members between a fixing member side opposing part and a supporting member side opposing part that oppose in a direction of an axis. Therefore, the rotation supporting mechanism member can be easily downsized in a radial direction, and the optical unit with shake correction function can be easily downsized in the radial direction.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 8 is an exploded perspective view of the movable member when seen from the object side;

FIG. 10 is a sectional view of the optical unit when taken along a plane orthogonal to an axis; and FIGS. 11A and 11B are illustrative views of a plate spring.

DETAILED DESCRIPTION

Hereinafter, an embodiment of an optical unit to which the present invention is applied will be described with reference to the accompanying drawing. In the present specification, three axes X, Y, and Z correspond to the related directions that are respectively orthogonal to each other, one side in the X axis direction is designated by +X and the other side by −X; one side in the Y axis direction is designated by +Y and the other side by −Y; and one side in the Z axis direction is designated by +Z and the other side by −Z. The Z axis direction is coincident with a direction of an axis of an optical module. The +Z direction corresponds to an object side in the direction of the axis of the optical module, and the −Z direction corresponds to a counter-object side (image side) in the direction of the axis. The axis of the optical module is coincident with an optical axis of the optical module.

Entire Configuration

Figure 1:
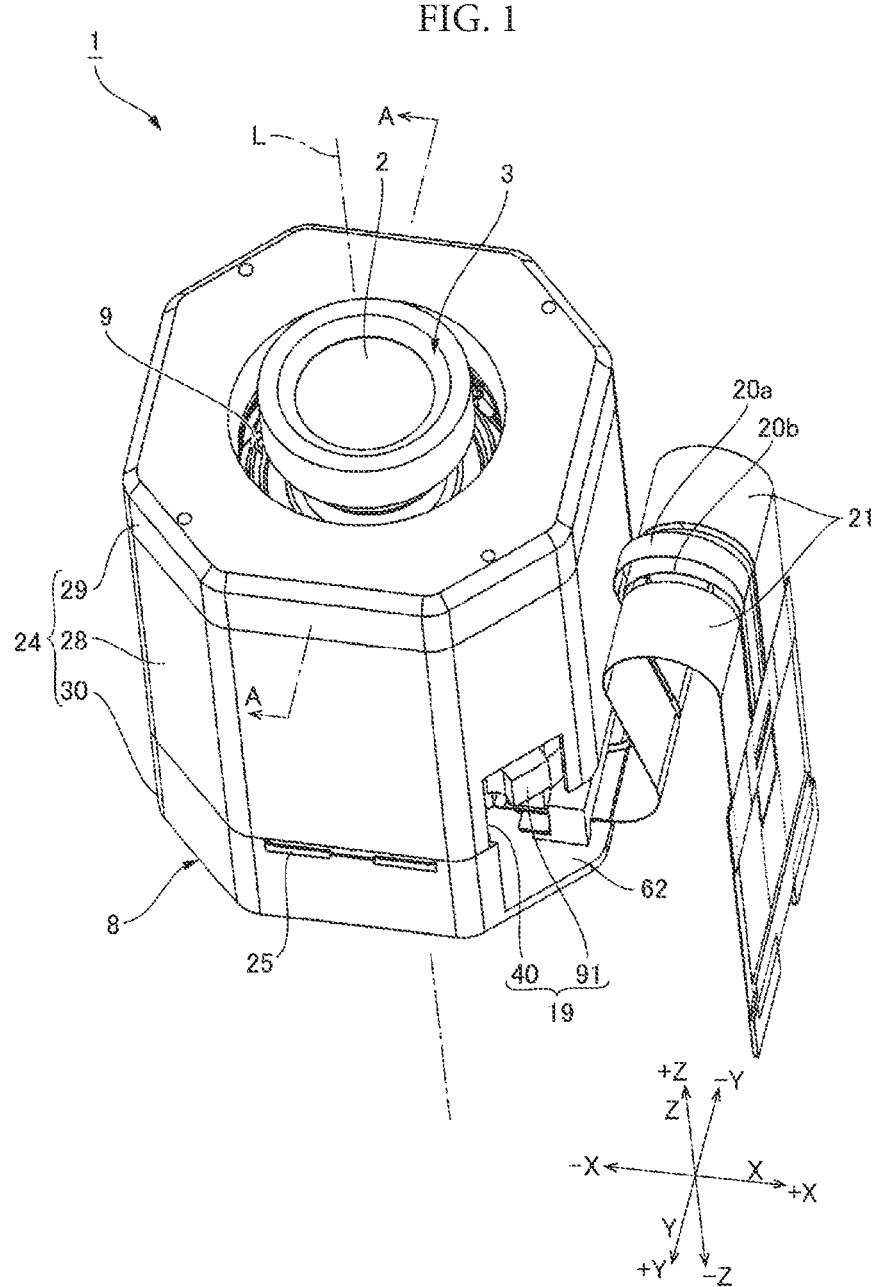
FIG. 1 is a perspective view when an optical unit to which at least an embodiment of the present invention is applied is seen from an object side.
Figure 2:
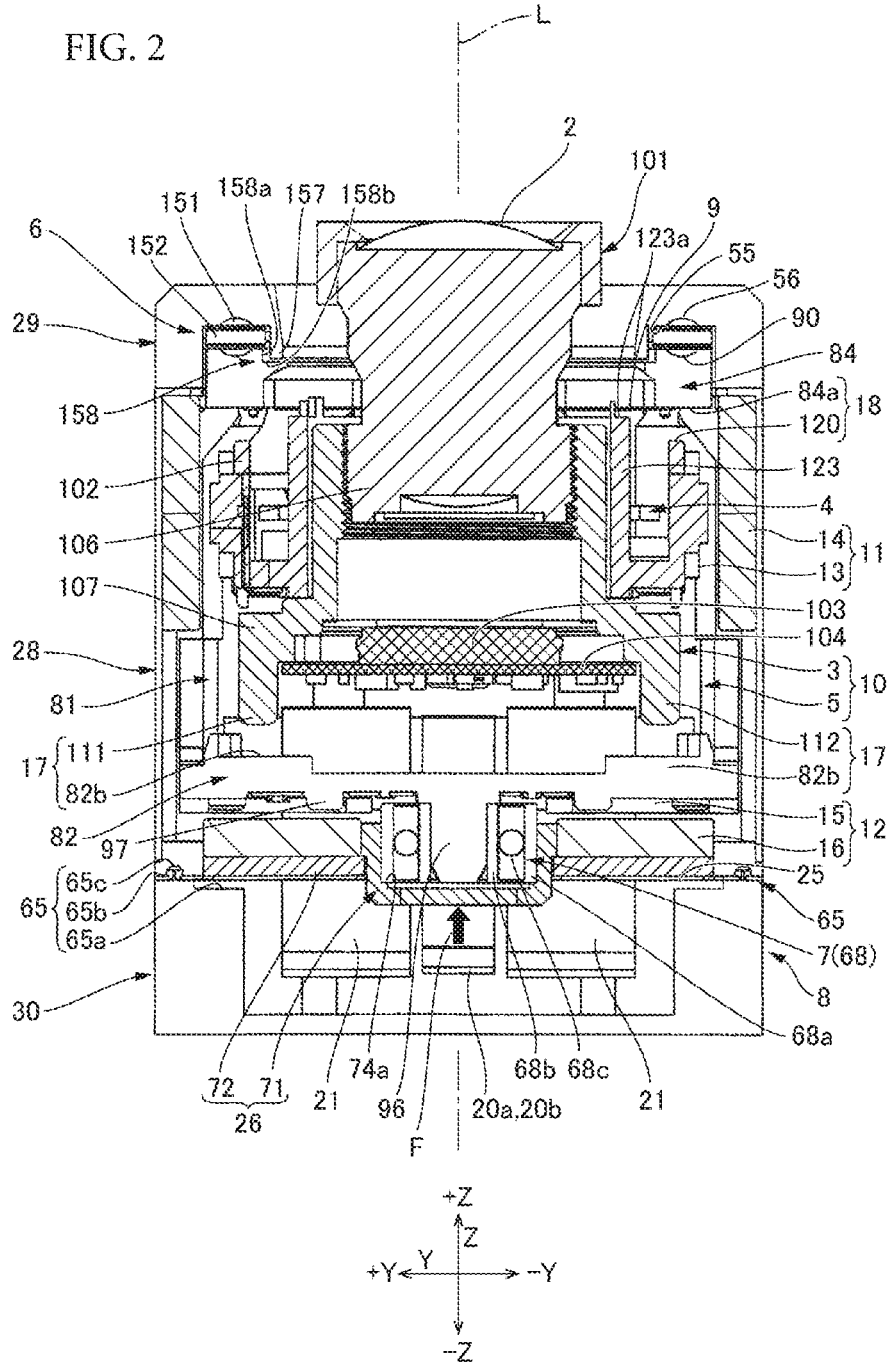
FIG. 2 is a sectional view of the optical unit taken along the line A-A of FIG. 1.
Figure 3:
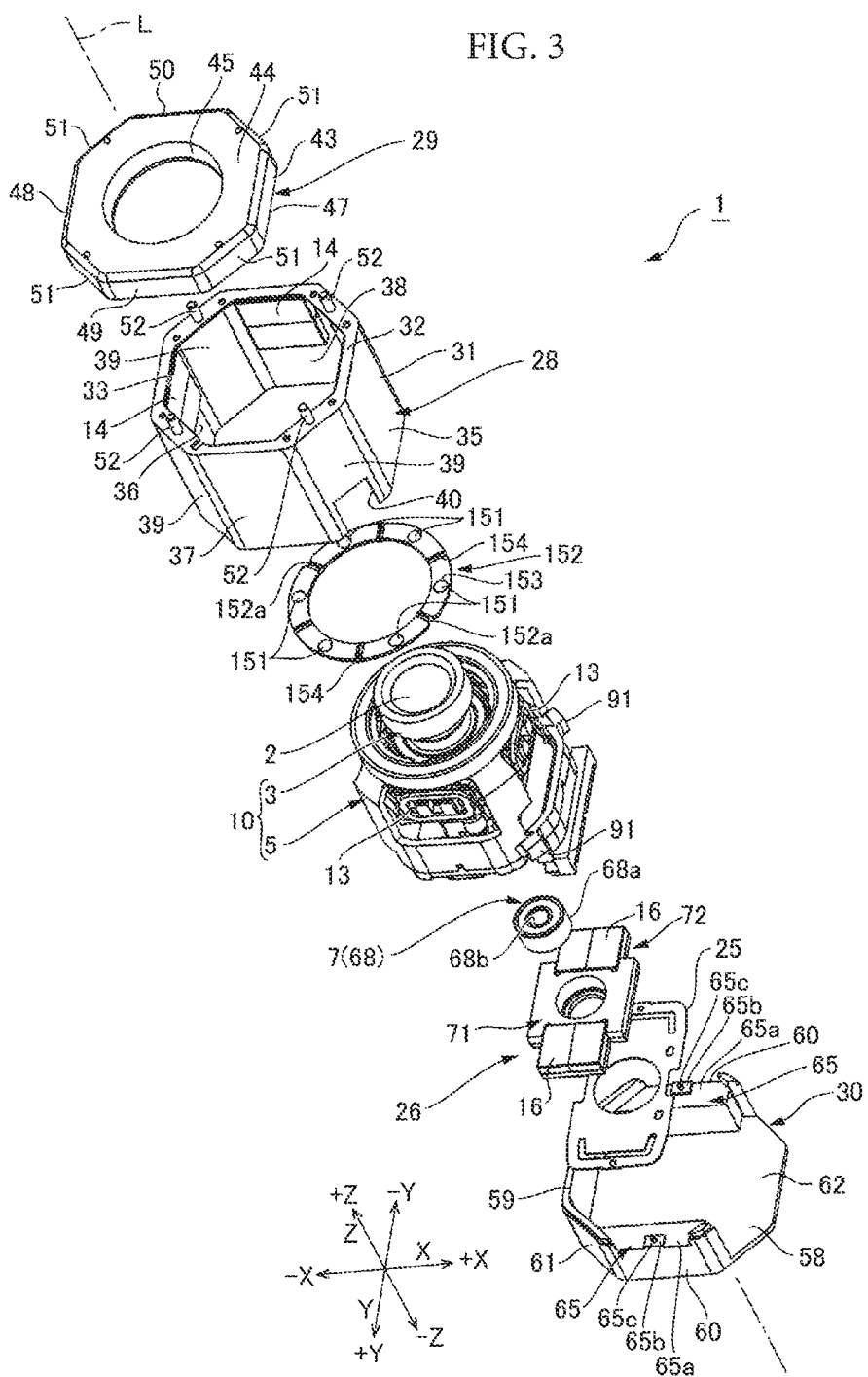
FIG. 3 is an exploded perspective view when the optical unit of FIG. 1 is seen from the object side.
Figure 4:
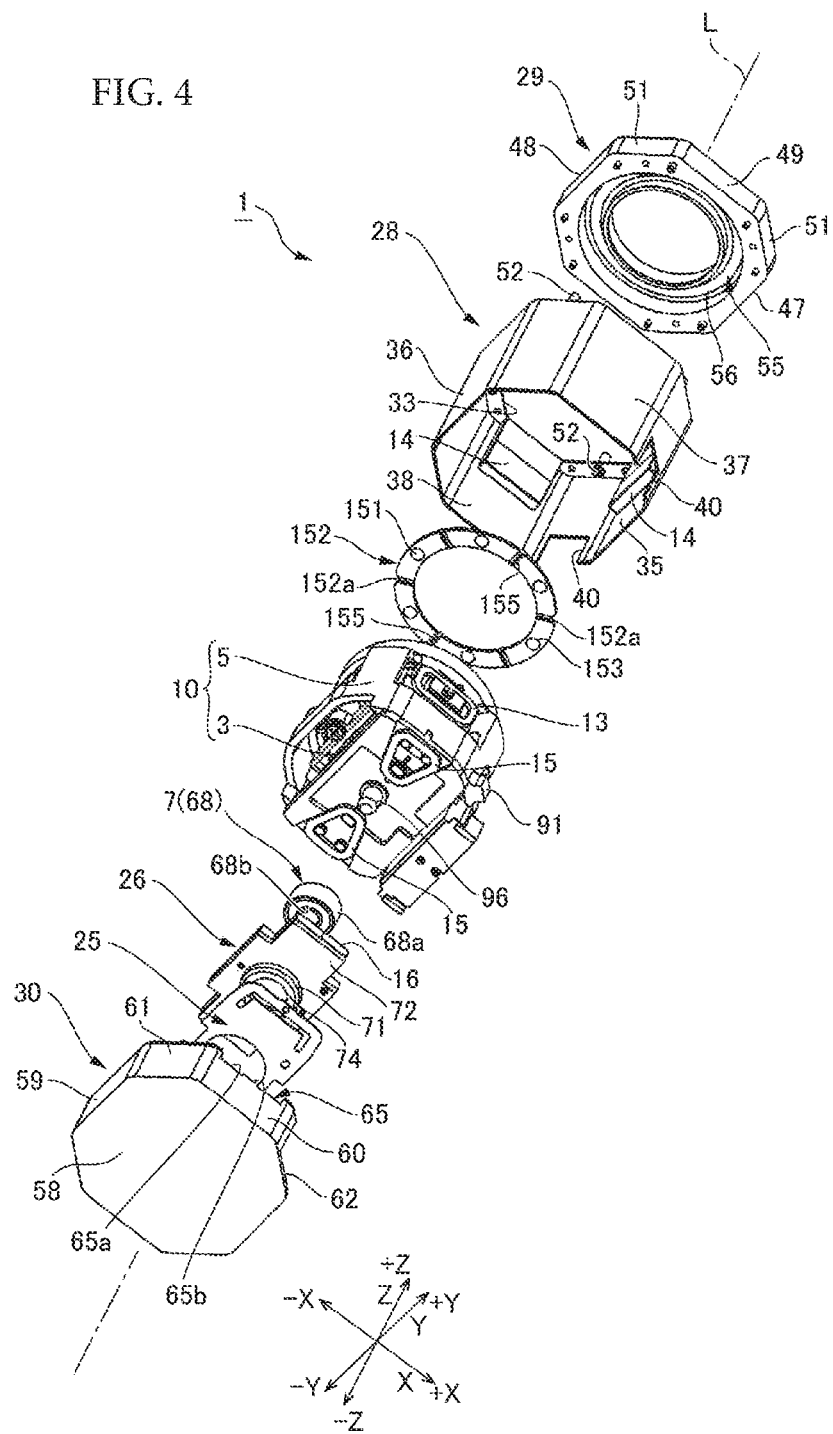
FIG. 4 is an exploded perspective view of the optical unit of FIG. 1 when seen from a counter-object side.

FIG. 1 is a perspective view of an optical unit to which at least an embodiment of the present invention is applied, when seen from an object side. FIG. 2 is a sectional view of the optical unit taken along the line A-A of FIG. 1. FIG. 3 is an exploded perspective view of the optical unit of FIG. 1 when seen from the object side. FIG. 4 is an exploded perspective view of the optical unit of FIG. 1 when seen from a counter-object side. Incidentally, it is to be noted that in the figures other than FIG. 1, a flexible printed circuit board is briefly shown. An optical unit 1 shown in FIG. 1 is employed in an optical device such as a cellular phone with camera or a drive recorder or an optical device such as an action camera or a wearable camera incorporated in a mobile object such as a radio controlled helicopter. In such an optical device, if vibration of the optical device occurs at the time of image acquisition, distortion of a picked up image occurs. The optical unit 1 is an optical unit with shake correction function configured to correct tilt of an optical element 2 in order to avoid tilting of the picked up image.

As shown in FIG. 2, the optical unit 1 is provided with: a movable member 3 (optical module) provided with the optical element 2; a swingable supporting mechanism 4 configured to swingably support the movable member 3; and a holder 5 (supporting member) configured to support the movable member 3 via the swingable supporting mechanism 4. In addition, the optical unit 1 is provided with: a first rotation supporting mechanism 6 and a second rotation supporting mechanism 7 configured to rotatably support the holder 5; and a fixing member 8 configured to support the holder 5 via the first rotation supporting mechanism 6 and the second rotation supporting mechanism 7. Further, the optical unit 1 is provided with a plate spring 9 that is overhung between the movable member 3 and the holder 5.

The swingable supporting mechanism 4 is configured to swingably support the movable member 3 between a reference position in which a predetermined axis L and an optical axis of the optical element 2 are coincident with each other and a tilt position in which the optical axis tilts relative to the axis L. The swingable supporting mechanism 4 is a gimbal mechanism. The first rotation supporting mechanism 6 and the second rotation supporting mechanism 7 are configured to rotatably support the holder 5 at the periphery of the axis L. In other words, the first rotation supporting mechanism 6 and the second rotation supporting mechanism 7 are configured to rotatably support, at the periphery of the axis L, a second movable member 10 that consists of the holder 5 and the movable member 3 that is swingably supported by the holder 5. The first rotation supporting mechanism 6 and the second rotation supporting mechanism 7 are configured between the fixing member 8 and the holder 5. The second rotation supporting mechanism 7 is positioned in the −Z direction (counter-object side) more significantly than the first rotation supporting mechanism 6. The plate spring 9 is for defining the reference position of the movable member 3.

In addition, the optical unit 1 is provided with: a magnetic driving mechanism 11 for swing configured to swing the movable member 3; and a magnetic driving mechanism 12 for rolling configured to rotate the holder 5 (second movable member 10). The magnetic driving mechanism 11 for swing is provided with: a swing driving coil 13 that is held by the movable member 3; and a swing driving magnet 14 that is held by the fixing member 8. The swing driving coil 13 and the swing driving magnet 14 respectively oppose to each other in a radial direction that is orthogonal to the axis L. The magnetic driving mechanism 12 for rolling is provided with: a rolling driving coil 15 that is held by the holder 5; and a rolling driving magnet 16 that is held by the fixing member 8. In the present embodiment, the rolling driving coil 15 and the rolling driving magnet 16 respectively oppose to each other in the Z axis direction (direction of the axis).

Further, the optical unit 1 is provided with: a first stopper mechanism 17 and a second stopper mechanism 18 that define a swinging range of the movable member 3; and a third stopper mechanism 19 (refer to FIG. 1) configured to define a rotation range of the holder (second movable member). Furthermore, the optical unit 1 is provided with a flexible printed circuit board 20a, 21b, 21. The flexible printed circuit board 20a is electrically connected to the rolling driving coil 15. The flexible printed circuit board 20b is electrically connected to the swing driving coil 13. The flexible printed circuit board 21 is electrically connected to a board 104 that the movable member 3 holds.

Fixing Member

As shown in FIG. 1. FIG. 3, and FIG. 4, the fixing member 8 has: a fixing member main body 24 configured by assembling three casings 28, 29, 30; a plate spring 25 (spring member) that is fixed to the fixing member main body 24; and a movable holder 26 that is supported by the fixing member main body 24 via the plate spring 25. The movable holder 26 is supported in a movable state in the Z axis direction. As shown in FIG. 1, the fixing member main body 24 is provided with: a cylindrical casing 28 formed in a substantially octagonal shape when seen from the side in the Z axis direction (direction of the axis); an object side casing 29 that is assembled in the +Z-direction (object side) relative to the cylindrical casing 28; and a counter-object side casing 30 that is assembled in the −Z direction (counter-object side) relative to the cylindrical casing 28. The cylindrical casing 28 is formed of a magnetic material. The object side casing 29 and the counter-object side casing 30 each are formed of a resin material.

As shown in FIG. 3, the cylindrical casing 28 is provided with: a cylindrical body part 31 formed in an octagonal shape; and a frame-shaped end plate part 32 extending to the inside from an end part in the +Z direction of the body part 31. In a center of the end plate part 32, a substantially octagonal aperture part 33 is formed. The body part 31 is provided with: side plates 35, 36 respectively opposing to each other in the X axis direction; side plates 37, 38 respectively opposing to each other in the Y axis direction; and a side plate 39 provided at four corners, each of which tilts at an angle of 45 degrees relative to the X axis direction and the Y axis direction. As shown in FIG. 3 and FIG. 4, on the inner circumferential faces of the side plates 35, 36 respectively opposing to each other in the X axis direction and the side plates 37, 38 respectively opposing to each other in the Y axis direction, swing driving magnets 14 are respectively fixed. In addition, as shown in FIG. 4, in two side plates 39 that are positioned in the +X direction of four side plates 39, rectangular cutout parts 40 are respectively formed. The cutout parts 40 each are formed in a shape in which an end edge in the −Z direction of the side plate 39 is cut away in the +Z direction.

The object side casing 29 is provided with: a cylindrical body part 43 abutting against the end plate part 32 of the cylindrical casing 28; and an end plate part 44 extending to the inside from an end part in the +Z direction of the body part 43. In a center of the end plate part 44, a circular aperture part 45 is formed. As shown in FIG. 4, an inner circumferential face of the body part 43 is a substantially circular shape, and is a substantial octagonal shape when seen from the side in the Z axis direction. An outer circumferential face of the body part 43 is provided with: side faces 47, 48 respectively opposing to each other in the X axis direction; side faces 49, 50 respectively opposing to each other in the Y axis direction; and a side face 51 provided at four corners, each of which tilts at an angle of 45 degrees relative to the X axis direction and the Y axis direction. The object side casing 29 is fixed to the cylindrical casing 28 by way of four head screws 52 passing through the end plate part 32 of the cylindrical casing 28 in the −Z direction and screwed to the body part 43. Here, a face in the −Z direction of the end plate part 44 is an annular face that is coaxial to the axis L, and is also a fixing member side opposing part 55 that corresponds to the holder 5 in the Z axis direction. In the fixing member side opposing part 55, a fixing member side annular groove 56 is provided. The fixing member side annular groove 56 is coaxial to the axis L, and the related sectional shape is an arc.

The counter-object side casing 30, as shown in FIG. 3, is provided with: an end plate part 58 formed in a substantially octagonal shape and orthogonal to the axis L; a wall part 59 rising in the +Z direction from an end edge (edge) in the −X direction of the end plate part 58; two wall parts 60 rising in the +Z direction from an end edge (edge) in the −Y direction of the end plate part 58 and an end edge (edge) in the +Y direction and respectively opposing to each other in the Y axis direction; and two wall parts 61 positioned between the wall part 59 and a respective one of the two wall parts 60, each of which tilts at an angle of 45 degrees relative to the X axis direction and the Y axis direction. Here, a wall part is not provided at an end edge (edge) in the +X direction of the end plate part 58, and an aperture part 62 is provided between edges in the +X direction of the two wall parts 60 respectively opposing to each other in the Y axis direction. As shown in FIG. 1, the aperture part 62 is a drawing outlet of the flexible printed circuit boards 20a, 20b, 21.

At end portions in the +Z direction of the two wall parts 60 respectively opposing to each other in the Y axis direction, plate spring fixing parts 65 that fix both end parts in the Y direction of the plate spring 25 are respectively provided. Each plate spring fixing part 65 is provided with: an end face 65a spreading in the X axis direction and the Y axis direction in an offset location in the −Z direction more significantly than a tip end of the wall part 59; a rectangular projection part 65b that is formed at an edge portion on the outer circumferential face of each end face 65a; and a circular projection 65c that projects in the +Z direction from a center of the rectangular projection part 65b.

Figure 5:
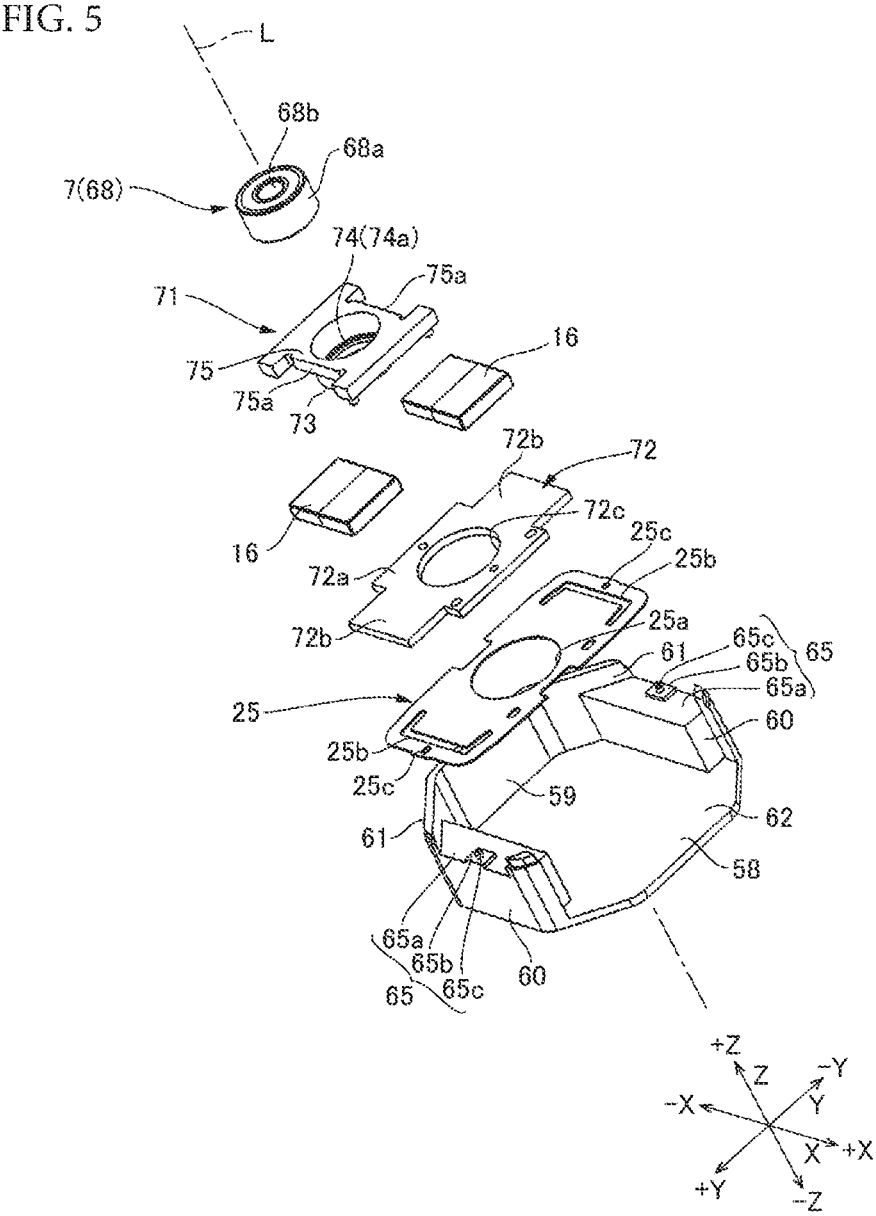
FIG. 5 is an exploded perspective view of a counter-object side portion of a fixing member.

FIG. 5 is an exploded perspective view of counter-object side portion (second rotation supporting mechanism 7, movable holder 26, plate spring 25, and counter-object side casing 30) of the fixing member 8. As shown in FIG. 5, the movable holder 26 is provided with: an outer ring 68a of a ball bearing 68 that configures the second rotation supporting mechanism 7; and a movable holder main body member 71 configured to hold two rolling driving magnets 16. In addition, the movable holder 26 is provided with a yoke 72 that abuts against the movable holder main body member 71 in the −Z direction. The movable holder main body member 71 is provided with: a cylinder part 73 with which the outer ring 68*a* engages, on the inner circumferential side; a circular ring-shaped part 74 projecting to the inner circumferential side from an end in the −Z direction of the cylinder part 73; and a magnet holding part 75 spreading in the outer circumferential side from an end portion in the +Z direction of the cylinder part 73. The circular ring-shaped part 74 is provided with an annular abutment part 74*a* that abuts against the outer ring 68*a* in the −Z direction. The magnet holding part 75 is provided with a pair of rectangular depression part 75*a* that depress from both sides in the Y axis direction to the inside in the radial direction. Two rolling driving magnets 16 are respectively engaged into the depression parts 75*a* from the outer circumferential side and then are held by the movable holder main body member 71.

A yoke 72 is formed of a magnetic material. The yoke 72 is provided with: a rectangular wide portion 72*a* that is positioned at a center portion in the Y axis direction; and a rectangular portion 72*b* extending from the wide portion 72*a* to both sides in the Y axis direction. A width of the rectangular portion 72*b* in the X axis direction is smaller than a width of the wide portion 72*a*. In a center of the wide portion, a circular hole 72*c* is provided. In the yoke 72, the cylinder part 73 of the movable holder main body member 71 is inserted into the circular hole 72*c* from the side in the +Z direction; the wide portion 72*a* abuts against the movable holder main body member 71 in the −Z direction; and the rectangular portion 72 abuts against the rolling driving magnet 16 in the −Z direction. A contour shape of the yoke 72 is coincident with a contour shape of the movable holder main body member 71 having held the rolling driving magnet 16 by itself when seen from the side in the Z axis direction. Here, in the yoke 72, an adhesive agent is applied to a portion which the rolling driving magnet 16 abuts against, and the rolling driving magnet 16 is fixed to the yoke 72 as well.

The plate spring 25 has a substantially rectangular contour shape that is elongated in the Y axis direction, the plate spring 25 has a through hole 25*a* through which the cylinder part 73 of the movable holder main body member 71 can be inserted into the center in the Y axis direction. In addition, the plate spring 25 has a U-shaped slit 25*b* on both sides in the Y axis direction while the through hole 25*a* is sandwiched therebetween. The shape of the two slits 25*b* is adapted to frame an end portion in the Y axis direction of the yoke 72 when the yoke 72 and the plate spring 25 are overlapped each other. In addition, the plate spring 25 has a fixing hole 25*c* for fixing the plate spring 25 to the plate spring fixing part 65 at each end portion in the Y axis direction (outer in the Y axis direction than the two slits 25*b*).

The plate spring 25 is supported by the plate spring fixing part 65 in a state in which the projection 65*c* is inserted into the fixing hole 25*c* and the center portion at each end portion in the Y axis direction is placed on the projection part 65*b*. In addition, as shown in FIG. 1, the cylindrical casing 28 and the counter-object side casing 30 are assembled with each other, and the plate spring 25 is thereby sandwiched between the cylindrical casing 28 and the counter-object side casing 30 and then is fixed to the fixing member 8. Here, as shown in FIG. 2, when the movable holder 26 is supported by the fixing member 8, it follows that the plate spring 25 imparts a fixing force F of biasing the movable holder 26 to the +Z axis direction (object side). That is, it follows that the plate spring 25 slackens in the −Z direction (counter-object side) at a portion on the inner circumferential side more significantly than each end portion in the Y axis direction that is fixed to the plate spring fixing part 65, and biases the movable holder 26 in the +Z axis direction by its elastically resilient force.

Holder

Figure 6:
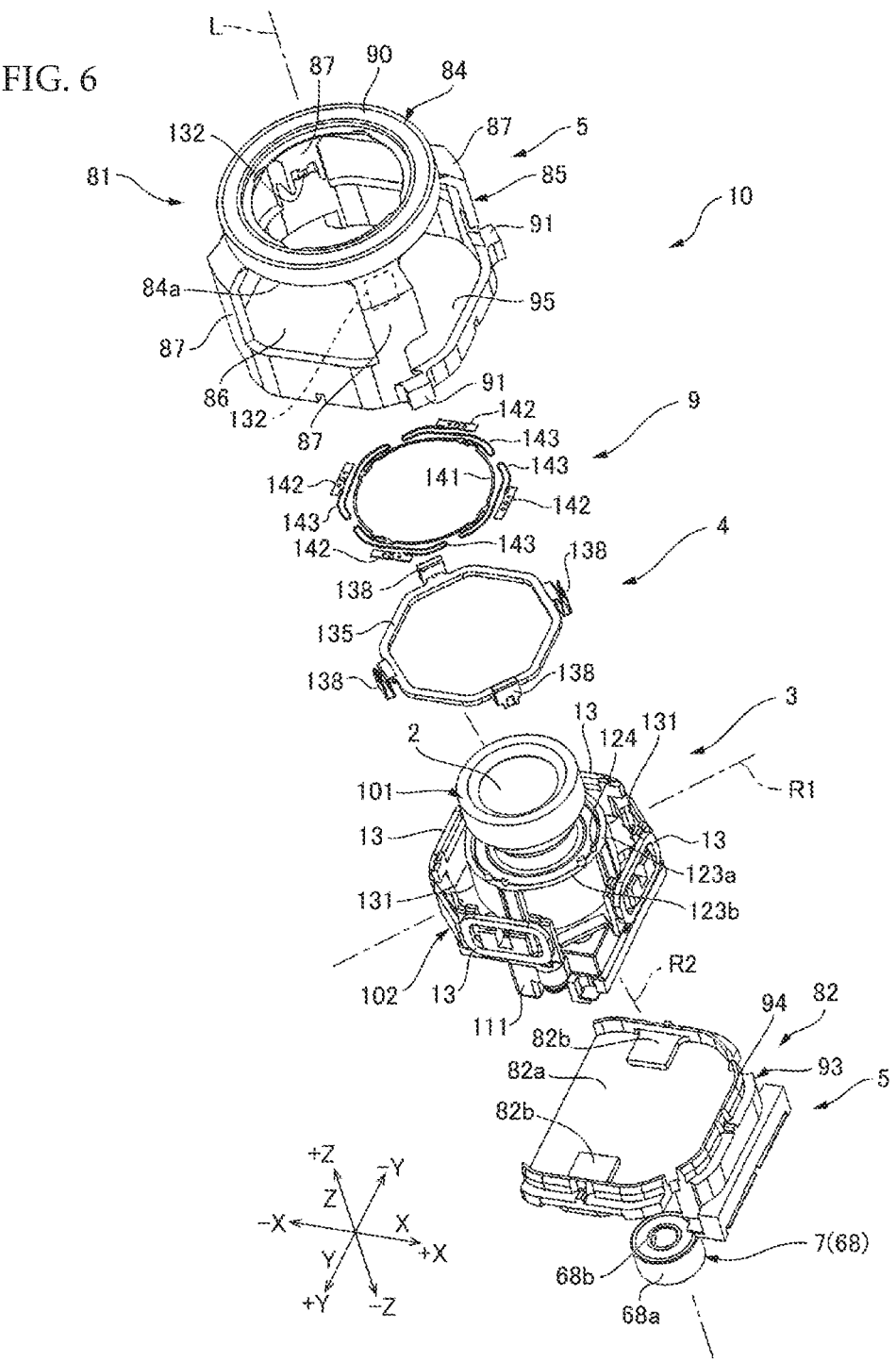
FIG. 6 is an exploded perspective view of a movable member and a holder when seen from the object side.
Figure 7:
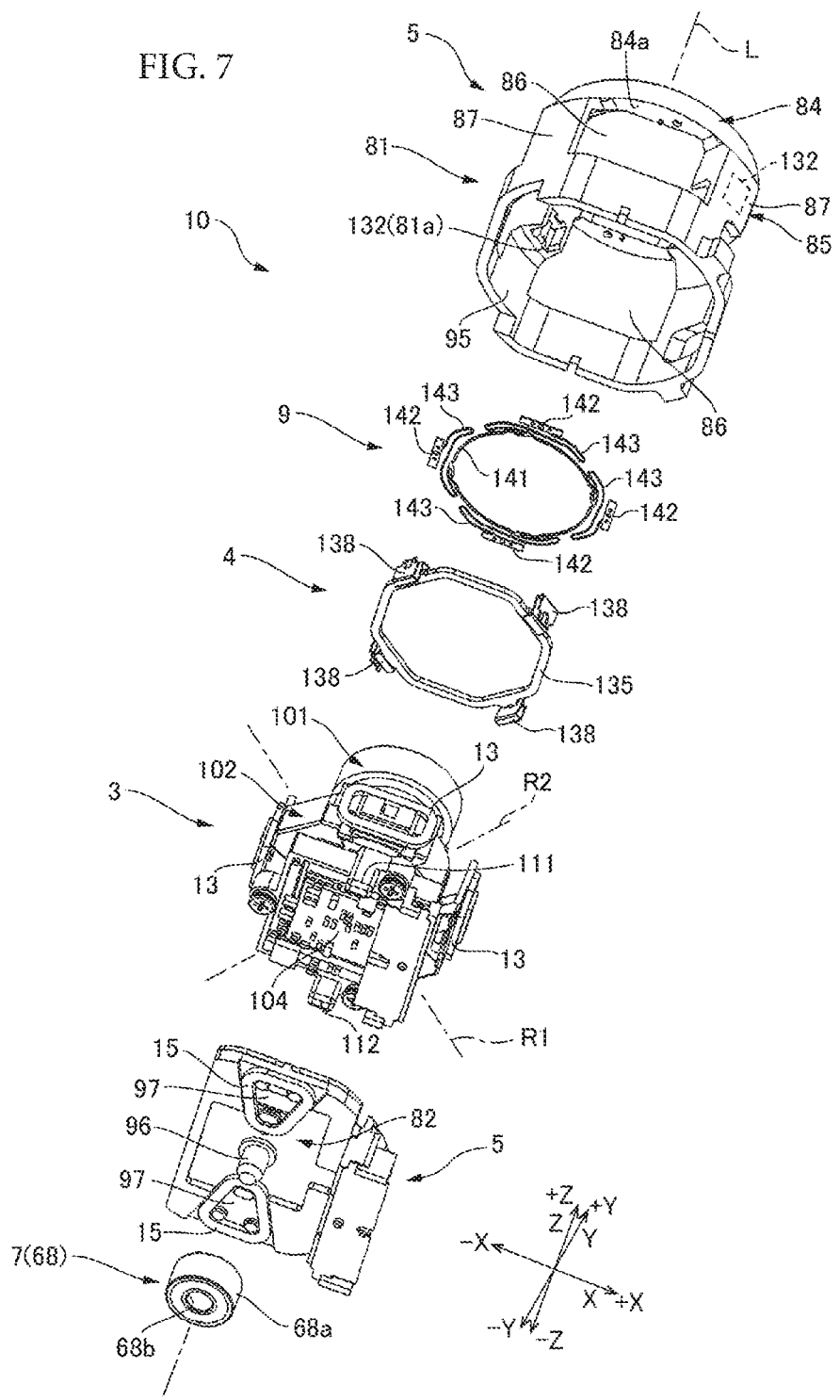
FIG. 7 is an exploded perspective view of the movable member and the holder when seen from the counter-object side.

FIG. 6 is an exploded perspective view of the movable member 3 and the holder 5 (second movable member 10) when seen from the side in the +Z direction. FIG. 7 is an exploded perspective view of the movable member 3 and the holder 5 (second movable member 10) when seen from the side in the −Z direction. As shown in FIG. 6, the holder 5 is provided with a holder main body member 81 that is positioned on the outer circumferential side of the movable member 3; and a holder bottom plate member 82 (second supporting member side opposing part) that is fixed to the holder main body member 81 in the −Z direction, the holder bottom plate member opposing to the movable member 3. The holder main body member 81 and the holder bottom plate member 82 are made of a resin.

As shown in FIG. 6, the holder main body member 81 is provided with: an annular holder side opposing part 84 (supporting member side opposing part) that opposes to an annular fixing member side opposing part 55 in a fixing member 8 (object side casing 29) at an end in the +Z direction; and a holder body part 85 that is continuous to the side of the −Z direction of the holder side opposing part 84. The holder body part 85 is provided with: four window parts 86 that are arranged in the circumferential direction; and four longitudinal frame parts 87 configured to partition the window parts 86 that are respectively adjacent to each other in the circumferential direction. Two window parts 86 of the four window parts 86 open in the X axis direction, and the other two open in the Y axis direction. The four longitudinal frame parts 87 each are disposed in an angular location between the X axis direction and the Y axis direction.

The holder side opposing part 84 is an annular face on which an end face on the side in the +Z direction is orthogonal to the axis L, and on the annular face, a holder side annular groove 90 (supporting side annular groove) is provided. The holder side annular groove 90, in the Z axis direction, opposes to a fixing member side annular groove 56 that is provided in the holder side opposing part 84. The holder side annular groove 90 is coaxial to the axis L, and the related sectional shape is an arc shape. The holder side opposing part 84 is provided with an annular end face 84*a* that is orthogonal to the axis L, the annular end face being oriented in the −Z direction.

In an end portion in the −Z direction in the holder body part 85, a projection 91 that projects in an intermediate direction between the +X direction and the +Y direction and a projection 91 that projects in a middle direction between the +X direction and −Y direction are provided.

The holder bottom plate member 82 is provided with an opposing face 82*a* that is orthogonal to the axis L, the opposing face opposing to the movable member 3 from the side in the −Z direction. At each end portion in the Y axis direction in the opposing face 82*a*, a rectangular projection portion 82*b* that projects in the +Z direction is provided. At an outer circumferential edge of the opposing face 82*a* of the holder bottom plate member 82, a stepped part 93 that surrounds a bottom plate from both sides in the Y axis direction and from the side in the +X direction is provided. The stepped part 93 is provided with an annular projection part 94 that projects in the +Z direction on the inner circumferential side. When the holder bottom plate member 82 is fixed to the holder main body member 81, the annular projection part 94 engages into an aperture part 95 in the −Z direction of the holder main body member 81 (holder body part 85).

In addition, the holder bottom plate member 82, as shown in FIG. 7, is provided with a shaft part 96 that projects in the −Z direction. The shaft part 96 is provided so as to be coaxial to the axis L. The shaft part 96 is configured to hold an inner ring 68b of a ball bearing 68 on the outer circumferential side. An end face in the +Z direction in the inner ring 68b abuts against the holder bottom plate member 82. In addition, the holder bottom plate member 82 is provided with rolling driving coil holding parts 97 on both sides on which the shaft part 96 is sandwiched therebetween in the Y axis direction. A rolling driving coil 15 is held by the rolling driving coil holding parts 97 from the side in the −Z direction. Here, a flexible printed circuit board 20a is electrically connected to the rolling driving coil 15 that is held by the holder bottom plate member 82.

Movable Member

Figure 9:
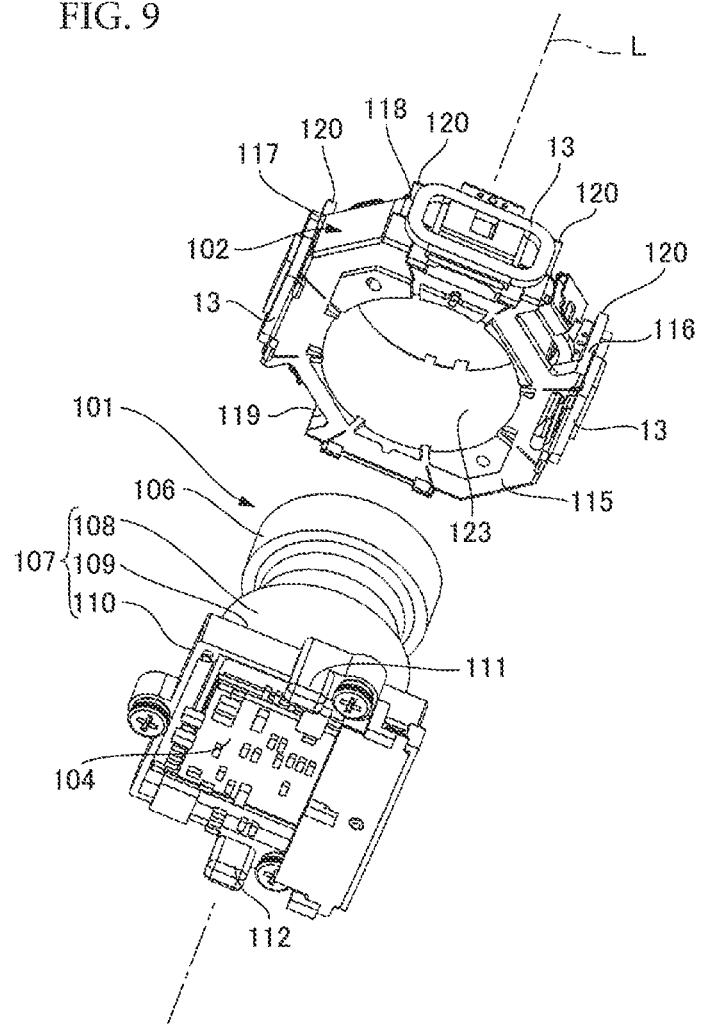
FIG. 9 is an exploded perspective view of the movable member when seen from the counter-object side.

FIG. 8 is an exploded perspective view of the movable member 3, the swingable supporting mechanism 4, and the plate spring 9 when seen from the side in the +Z direction (object side). FIG. 9 is an exploded perspective view of the movable member 3, the swingable supporting mechanism 4, and the plate spring 9 when seen from the side in the −Z direction (counter-object side). As shown in FIG. 8 and FIG. 9, the movable member 3 is provided with: a camera module 101; and a camera module holder 102 configured to hold the camera nodule 101 from the outer circumferential side. The camera nodule 101, as shown in FIG. 2, has: an optical element 2; and an image pickup element 103 that is positioned on the optical axis of the optical element 2. The image pickup element 103 is implemented on a board 104 on which an electronic device such as a gyroscope or a signal processing circuit has been mounted. In addition, the camera module 101 has: a mirror cylinder member 106 configured to hold the optical element 2; and a frame 107 configured to hold the mirror cylinder member 106 and the board 104. As shown in FIG. 8, the frame 107 is provided with: a cylinder part 108 configured to hold an end portion in the −Z direction of the mirror cylinder member 106 on the inner circumferential side; a rectangular plate part 109 spreading from an end edge in the −Z direction of the cylinder part 108 to the outer circumferential side; and a rectangular tube part 110 extending in the −Z direction from the outer circumferential edge of the plate part 109. As shown in FIG. 9, the board 104 is held by the inner circumferential side of the rectangular tube part 110.

In the rectangular tube part 110, in the Y axis direction, an optical axis (axis L), an image pickup element 103, and a first projection part 111 for stopper and a second projection part 112 for stopper that project in the −Z direction on both side on which the board 104 is sandwiched therebetween are provided.

As shown in FIG. 9, the camera module holder 102 is provided with: a bottom plate part 115 formed in a substantially octagonal shape when seen from the side in the Z axis direction; a pair of wall parts 116, 117 rising in the +Z direction and extending in the Y axis direction on both ends in the X axis direction of the bottom plate part 115; and a pair of wall parts 118, 119 rising in the +Z direction and extending in the X axis direction on both sides in the Y axis direction of the bottom plate part 115. On end faces in the +Z direction in the respective wall parts 116, 117, 118, 119, two second projection parts 120 for stopper that project in the +Z direction are provided. The two second projection parts 120 for stopper respectively project from both end portions in the circumferential directions in each of the wall parts 116, 117, 118, 119. To each of the wall parts 116, 117, 118, 119, the swing driving coil 13 is fixed.

In addition, the camera module holder 102 is provided with a cylindrical holding part 123 rising in the +Z direction from an edge of a circular through hole that is formed at a center of a bottom plate part 115. In an annular end face 123a in the +Z direction of the holding part 123, plate spring bonding projection parts 124 for fixing the plate spring 9 are provided in four locations at equal angular intervals. As shown in FIG. 6, in the annular end face 123a, the outer circumferential side of a plate spring bonding projection part 124 is a movable member side plate spring fixing part 123b configured to fix the plate spring 9 thereto. The plate spring 9 is fixed via an adhesive layer to the movable member side plate spring fixing part 123b.

Here, the flexible printed circuit board 20b is fixed to the camera module 101, and is electrically connected to the swing driving coil 13 that is fixed to the respective wall parts 116, 117, 118, 119 of the camera module holder 102. The flexible printed circuit board 21 is fixed to the camera module 101, and is electrically connected to the board 104 that is held by the rectangular tube part 110 of the camera module 101. The flexible printed circuit boards 20b and 21 are drawn between the first projection part 111 for stopper and the second projection part 112 for stopper.

Swingable Supporting Mechanism

FIG. 10 is a sectional view of the optical unit 1 when taken along a plane that is orthogonal to the axis L, the plane passing through the swingable supporting mechanism 4. The swingable supporting mechanism 4 is arranged between the camera module holder 102 and the holder main body member 81. As shown in FIG. 6 and FIG. 7, the swingable supporting mechanism 4 is provided with: two first swingable supporting parts 131 that are provided in diagonal locations on a first axis R1 of the camera module holder 102; two second swingable supporting parts 132 that are provided in diagonal locations on a second axis R2 of the holder main body member 81; and a movable frame 135 that is supported by the first swingable supporting part 131 and the second swingable supporting part 132. Here, the first axis R1 and the second axis R2 are orthogonal to the Z axis direction and each correspond to a direction tilting at an angle of 45 degrees relative to the X axis direction and the Y axis direction. Therefore, the first swingable supporting part 131 and the second swingable supporting part 132 each are disposed in an angular location between the X axis direction and the Y axis direction. As shown in FIG. 6 and FIG. 7, the second swingable supporting part 132 corresponds to a depression part 81a that is formed in an inside face of the holder main body member 81.

As shown in FIG. 10, the movable frame 135 corresponds to a plate-shaped spring formed in a substantially octagonal shape in planar view as seen from the side in the Z axis direction. On an outside face of the movable frame 135, metallic balls 137 are fixed by way of any means such as welding in four locations at the periphery of the axis L. These balls 137 respectively come into point contact with contact springs 138 held by the first swingable supporting part 131 that is provided in the camera module holder 102 and the second swingable supporting part 132 that is provided in the holder main body part 81. The contact spring 138 is a plate-shaped spring, the contact spring 138 held by the first swingable supporting part 131 is elastically deformable in the direction of the first axis R1, and the contact spring 138 held by the second swingable supporting part 132 is elastically deformable in the direction of the second axis R2. Therefore, the movable frame 135 is supported in a rotatable manner at the periphery of each of the two directions (the direction of the first axis R1 and the direction of the second axis R2) that are orthogonal to the Z axis direction.

Plate Spring

FIG. 11A is a plan view of the plate spring 9 when seen from the side in the Z axis direction, and FIG. 11B is a plan view of the movable member 3 and the holder 5 in a state in which the plate spring 9 is overhung when seen from the side in the +Z direction. As shown in FIG. 2, the plate spring 9 is overhung between the annular end face 123*a* of the holding part 123 of the camera module holder 102 (end face in the +Z direction) and the annular end face 84*a* oriented in the −Z direction in the holder side opposing part 84 of the holder main body member 81. The plate spring 9 defined a reference position of the movable member 3. That is, the position (reference position) of the movable member 3 (camera module 101) in a still state in which the magnetic driving mechanism 11 for swing is not driven is determined by the plate spring 9. As shown in FIG. 6, FIG. 7, and FIG. 11A, the plate spring 9 is a plate spring formed in the shape of a rectangular frame in which a metal plate has been machined.

As shown in FIG. 11A, the plate spring 9 is provided with: an annular movable side linking part 141 that is fixed to the movable body side plate spring fixing part 123*b* of the holding part 123; four holder side linking part 142 (supporting body side linking part) that are fixed to an end face of the holder main body member 81; and a meandering part 143 that is positioned between the movable side linking part 141 and each of the holder side linking parts 142 in a radial direction. The holder side linking parts 142 are disposed in two locations in which the optical axis L is sandwiched therebetween on both sides in the X axis direction and in two locations in which the optical axis L is sandwiched on both sides in the Y axis direction.

The movable member side linking part 141 is provided with: four link portions 141*a* having cutouts that are positioned on the outer circumferential sides of the four plate spring bonding projection parts 124 that are provided in the annular end faces 123*a* of the holding part 123; and connecting portions 141*b* formed in the shape of an arc and connecting the link portions 141*a* that are respectively adjacent to each other in the circumferential direction. Here, the movable member side linking part 141 is fixed to the annular end face 123*a* via an adhesive layer. Therefore, in the state in which the movable member side linking part 141 has been fixed to the annular end face 123*a*, the plate spring 9 is unstable in the +Z direction from the annular end face 123*a*. The four link portions 141*a* are respectively fixed to the plate spring bonding projection parts 124 via the adhesive layer. Therefore, in the state in which the link portions 141*a* have been fixed to the plate spring bonding projection parts 124, respectively, a gap is provided in a radial direction between the link portion 141*a* and the plate spring bonding projection part 124.

The meandering part 143, as shown in FIG. 11B, is provided with: a first extension portion 143*a* extending to one side (clockwise direction) in the circumferential direction on the outer circumferential side of the holding part 123 from the link portion 141*a* that is positioned on the outer circumferential side of the plate spring bonding projection part 124 in the state in which the movable side linking part 141 has been fixed to the holding part 123; a first return portion 143*b* curving to the other side in the circumferential direction from a tip end of the first extension portion 143*a* to the outer circumferential side; a second extension portion 143*c* extending from a tip end of the first return portion 143*b* to the other side (counterclockwise direction) in the circumferential direction on the outer circumferential side of the first extension portion 143*a* from a tip end of the first return portion 143*b*; a second return portion 143*d* curving to one side in the circumferential direction from a tip end of the second extension portion 143*c* to the outer circumferential side than the plate spring bonding projection part 124; and a third extension portion 143*e* extending to one side (clockwise direction) on the outer circumferential side of the second extension portion 143*c* from a tip end of the second return portion 143*d*. The tip end of the third extension portion 143*e* is positioned at the other side more significantly than the plate spring bonding projection part 124, and is connected to the holder side linking part 142.

First Stopper Mechanism and Second Stopper Mechanism

Here, as shown in FIG. 2, when the movable member 3 has been swingably held by the holder 5, the first projection part 111 for stopper and the second projection part 112 for stopper, both of which project in the −Z direction from the movable member 3 (camera module 101), and the rectangular projection portion 82*b* that is provided on the opposing face 82*a* of the holder bottom plate member 82 respectively oppose to each other in the Z axis direction and configure the first stopper mechanism 17 configured to define a swinging range of the movable member 3. That is, if the movable member 3 is set in a tilt posture exceeding the swinging range, the first projection part 111 for stopper and the second projection part 112 for stopper abut against the projection portion 82*b*, and restrict any more tilting of the movable member 3. Further, in the first stopper mechanism 17, in a case where the movable member 3 has been moved in the −Z direction by way of an external force, the first projection part 111 for stopper and the second projection part 112 for stopper abut against the projection portion 82*b*, and restrict any more movement of the movable member 3 in the −Z direction.

In addition, when the movable member 3 has been swingably held by the holder 5, the second projection part 120 for stopper, that is provided in the movable member 3 (camera module holder 102), and the annular end face 84*a* in the −Z direction of the holder side opposing part 84 respectively oppose to each other in Z axis direction, and configure the second stopper mechanism 18 configured to define a second swinging range of the movable member 3. That is, if the movable member 3 is set in a tilt posture exceeding the second swinging range, the projection part 120 for stopper abuts against the annular end face 84*a*, and restricts any more tilting of the movable member 3. Further, in the second stopper mechanism 18, in a case where the movable member 3 has been moved in the +Z direction by way of an external force, the second projection part 120 for stopper abuts against the annular end face 84*a*, and restricts any more tilting of the movable member 3 in the +Z direction. Incidentally, it is to be noted that the second swinging range that the second stopper mechanism 18 defines is the same as the swinging range that the first stopper mechanism 17 defines.

First Rotation Supporting Mechanism and Second Rotation Supporting Mechanism

Next, a description will be given with respect to the first rotation supporting mechanism 6 and the second rotation supporting mechanism 7 configured to rotatably support the holder 5 at the periphery of the axis L. As shown in FIG. 2, FIG. 3, and FIG. 4, the first rotation supporting mechanism 6 is provided with: a plurality of balls 151 (rolling members) and a retainer 152 configured to hold the balls 151 between the fixing member side opposing part 55 and the holder side opposing part 84. As shown in FIG. 3 and FIG. 4, the retainer 152 has a plurality of through holes 153 that are arranged at equal intervals in the circumferential direction. A respective one of the plurality of balls 151 is inserted into the fixing member side annular groove 56 and the holder side annular groove 90 while these grooves are disposed inside of a respective one of the plurality of through holes 153. Lubricating oil is applied to the inner circumferential faces of the fixing member side annular groove 56 and the holder side annular groove 90. In the present embodiment, the number of balls 151 and the number of through holes 153 are respectively six. The through holes 153 are provided at equal angular intervals at the periphery of the axis L. The balls 151 roll in the fixing member side annular groove 56 and the holder side annular groove 90 while these balls are respectively inserted into the through holes 153. Here, assuming that the number of balls 151 is three, these three balls may be alternately inserted into three of the six through holes 153. In this case as well, the respective balls 151 are disposed at equal angular intervals at the periphery of the axis L.

In addition, the retainer 152 is provided with: a first projection part 154 that projects toward the fixing member side opposing part 55 between the two through holes 153 that are respectively adjacent to each other in the circumferential direction; and a second projection part 155 that projects toward the holder side opposing part 84. As shown in FIG. 3, the first projection part 154 extends in the radial direction, and is provided with an arc face that projects in the +Z direction from each end in the circumferential direction toward a center. As shown in FIG. 4, the second projection part 155 extends in the radial direction, and is provided with an arc face that projects in the −Z direction from each end in the circumferential direction to the center. A center portion in the circumferential direction of the first projection part 154 is capable of coming into sliding contact with an edge portion on the inner circumferential side and an edge portion on the outer circumferential side of the fixing member side annular groove 56 in the fixing member side opposing part 55. A center portion in the circumferential direction of the second projection part 155 is capable of coming into sliding contact with an edge portion on the inner circumferential side and an edge portion on the outer circumferential side of the holder side annular groove 90 in the holder side opposing part 84. Further, the retainer 152 has cutout parts 152*a* in two locations that are respectively spaced from each other at an outer circumferential edge. In the present embodiment, the cutout parts 152*a* are provided at angular intervals of 180 degrees. Incidentally, while the first projection parts 154 and the second projection parts 155 are respectively provided (in six locations) between two through holes 153 that are respectively adjacent to each other in the circumferential direction, it is sufficient if these projection parts are formed in a plurality of locations at equal angular intervals at the periphery of the axis, and the number is not limited to six.

Here, as shown in FIG. 2, at an end portion of the inner circumferential side more significantly than the fixing member side annular groove 56 in the fixing member side opposing part 55, an annular projection part 157 that projects in the −Z direction is provided. On the other hand, at an end portion of the inner circumferential side more significantly than the holder side annular groove 90 in the holder side opposing part 84, an annular stepped part 158 depressed in the −Z direction and configured to receive a tip end portion of the annular projection part 157 is provided. The annular stepped part 158 is provided with: an annular radial opposing face 158*a* that opposes at small intervals from the outer circumferential side at the tip end portion of the annular projection part 157; and an annular axial opposing face 158*b* that opposes at small intervals from the side in the Z axis direction at the tip end portion of the annular projection part 157. A space between the annular projection part 157 and the radial opposing face 158*a* and a space between the annular projection part 157 and the axial opposing face 158*b* communicate with each other, and these spaces configure a rabbi squirrel seal. This rabbi squirrel seal prevents or restricts entry of dust between the fixing member side opposing part 55 on which the ball 151 rolls and the holder side opposing part 84.

Next, the ball bearing 68 of the second rotation supporting mechanism 7, as shown in FIG. 2, is provided with: an inner ring 68*b* that is held on the outer circumferential side of the shaft part 96 of the holder 5 (holder bottom plate member 82); an outer ring 68*a* that is positioned on the outer circumferential side of the inner ring 68*b*; and a plurality of balls 68*c* that roll between the inner ring 68*b* and the outer ring 68*a* in the radial direction. The outer ring 68*a* is held by the movable holder 26.

Here, the plate spring 25 is configured to impart, to the ball bearing 68, a given pressure (biasing force F) that is applied in the +Z direction. That is, the plate spring 25 is configured to bias the movable holder 26 toward the holder bottom plate member 82 to thereby bias the outer ring 68*a* that is held by the holder 5 to the holder bottom plate member 82. In this manner, the inner ring 68*b* and the outer ring 68*a* are positioned with respect to a relative location in the Z axis direction with reference to the holder bottom plate member 82. In addition, by the given pressure (biasing force F of the plate spring 25), a state in which the outer ring 68*a* has abutted against the holder bottom plate member 82 is maintained. In this manner, rotation of the holder 5 that is supported by the second rotation supporting mechanism 7 is stabilized.

Further, the plate spring 25 is configured to bias the holder 5 toward the fixing member side opposing part 55 of the fixing member 8 (object side casing 29) via the movable holder 26 and the outer ring 68*a*. In this manner, the plate spring 25 imparts, to the first rotation supporting mechanism 6, a given pressure (biasing force F of FIG. 2) that is applied in the +Z direction. That is, the plate spring 25 is configured to bias the holder side opposing part 84 toward the fixing member side opposing part 55 in the Z axis direction. In this manner, the holder side opposing part 84 and the fixing member side opposing part 55 are not spaced from each other in the Z axis direction and thus the ball 151 that is held by the retainer 152 does not slip off from a gap between the holder side annular groove 90 of the holder side opposing part 84 and the fixing member side annular groove 56 of the fixing member side opposing part 55, and the holder 5 smoothly rotates relative to the fixing member 8.

Third Stopper Mechanism

Here, as shown in FIG. 1, when the holder 5 has been rotatably supported by the fixing member 8, a projection 91 that is provided in the holder 5 (holder body part) is inserted into the cutout part 40 of the fixing member 8 (cylindrical casing 28) from the inner circumferential side. In this manner, the cutout part 40 of the fixing member 8 and the projection 91 of the holder 5 configure the third stopper mechanism 19 configured to restrict a rotation range at the periphery of the axis L of the holder 5 (second movable member 10). That is, in the holder 5, the projection 91 rotates in the cutout part 40 at the periphery of the axis L in a movable range in the circumferential direction.

Magnetic Driving Mechanism for Swing

Next, the magnetic driving mechanism 11 for swing, as shown in FIG. 10, is provided with a first magnetic driving mechanism 11A for swing and a second magnetic driving mechanism 11B for swing, both of which are provided between the movable member 3 and the fixing member 8. The first magnetic driving mechanism 11A for drive is provided in two sets, each of which consists of a swing driving magnet 14 and a swing driving coil 13 respectively opposing to each other in the X axis direction. The second magnetic driving mechanism 11B for swing is provided in two sets, each of which consists of the swing driving magnet 14 and the swing driving coil 13 respectively opposing to each other in the Y axis direction. The swing driving coil 13 is held on the outside faces of the wall parts 116, 117 on both sides in the X axis direction and the wall parts 118, 119 on both sides in the Y axis direction of the camera module holder 102. The swing driving magnet 14 is held on the inside face of each of the side plates 35, 36, 37, 38 that are provided in the cylindrical casing 28 of the fixing member 8. Each swing driving magnet 14, as shown in FIG. 3 and FIG. 4, is divided into two sections in the Z axis direction, and the magnetic poles on the interior face side are magnetized so as to be different from each other with reference to a divisional location (magnetized polarized line). The swing driving coil 13 is a coreless coil, and the long edge portions in the +Z direction and –Z direction each are utilized as an effective edge. Here, the cylindrical casing 28 is made of a magnetic material and thus function as a yoke relative to the swing driving magnet 14.

Two sets of the second magnetic driving mechanism 11B for swing, both of which are positioned in the +Y direction and the –Y direction of the movable member 3, are connected by way of wiring so that a magnetic driving force in the same direction at the periphery of the X axis is generated when power is supplied to the swing driving coil 13. In addition, two sets of the first magnetic driving mechanism 11A for swing, both of which are positioned in the +X direction and the –X direction of the movable member 3 are connected by way of wiring so that a magnetic driving force in the same direction at the periphery of the Y axis is generated when power is supplied to the swing driving coil 13. The magnetic driving mechanisms 11 for swing is configured to combine rotation at the periphery of the X axis by the second magnetic driving mechanism 11B for swing and rotation of the Y axis by the first magnetic driving mechanism 11A for swing with each other to thereby rotate the movable member 3 at the periphery of the first axis R1 and the second axis R2. In a case where image stabilization at the periphery of the X axis and image stabilization at the periphery of the Y axis are carried out, this driving mechanism is configured to combine the rotation at the periphery of the first axis R1 and the rotation at the periphery of the second axis R2 with each other.

Magnetic Driving Mechanism for Rolling

The magnetic driving mechanism 12 for rolling, as shown in FIG. 2 and FIG. 7, is provided with: two rolling driving coils 15 that are held by the rolling driving coil holding parts 97 that are provided on both sides on which the shaft part 96 is sandwiched therebetween in the Y axis direction, in the holder bottom plate member 82; two rolling driving magnets 16 held by the movable holder of the fixing member 8 and opposing each of the rolling driving coils 15 in the Z axis direction. Each rolling driving magnet 16, as shown in FIG. 3 and FIG. 5, is divided into two sections in the circumferential direction, and magnetic poles on a face opposing to the rolling driving coil 15 are magnetized so as to be different from with reference to a divisional location (magnetized polarized line). Each rolling driving coil 15 is a coreless coil, and a long edge portion extending in a radial direction is utilized as an effective edge.

Image Stabilization of Optical Unit

The optical unit 1, as described above, is provided with the magnetic driving mechanism 11 for rolling, configured to carry out image stabilization at the periphery of the X axis and image stabilization at the periphery of the Y axis. Therefore, this optical unit is capable of carrying out image stabilization in the pitching (vertical swing) direction and the yawing (transverse swing) direction. In addition, the optical unit 1 is provided with the magnetic driving mechanism 12 for rolling and thus this optical unit is capable of carrying out image stabilization in the rolling direction. Here, in the optical unit 1, the movable member 3 is provided with a gyroscope, and by way of the gyroscope, the vibration at the periphery of the three axes orthogonal to each other is detected and the magnetic driving mechanism 11 for swing and the magnetic driving mechanism 12 for rolling are driven so as to eliminate the detected vibration.

Functions and Advantageous Effects

In the present embodiment, the first rotation supporting mechanism 6 is provided with a plurality of balls 151 between the fixing member side opposing part 55 and the holder side opposing part 84, both of which oppose in the Z axis direction. Therefore, the first rotation supporting mechanism 6 can be downsized in the radial direction in comparison with a case in which the balls 151 are positioned on the outer circumferential side of the holder 5 configured to support the movable member 3. Accordingly, the optical unit 1 can be downsized in the radial direction.

In addition, the balls 151 roll in the fixing member side annular groove 56 that is provided in the fixing member side opposing part 55 and the holder side annular groove 90 that is provided in the holder side opposing part 84, and the balls can move in the circumferential direction and thus the holder 5 rotates smoothly.

Further, the first rotation supporting mechanism 6 is provided with the retainer 152 configured to hold the balls 151 between the fixing member side opposing part 55 and the holder side opposing part 84 and thus the balls 151 do not slip off from a gap between the fixing member side opposing part 55 and the holder side opposing part 84. In addition, the retainer 152 is configured to hold the balls 151 in the through holes 153 that are provided at equal intervals in the circumferential direction, so that the intervals of the balls 151 in the circumferential direction can be stably maintained.

Furthermore, the retainer 152 is provided with: the first projection part 154 that projects toward the fixing member side opposing part 55 between the two through holes 153 that are respectively adjacent to each other; and the second projection part 155 that projects toward the holder side opposing part 84. Still furthermore, the first projection part 154 is capable of coming into sliding contact with an edge portion of the fixing member side annular groove 56 in the fixing member side opposing part 55, and the second projection part 155 is capable of coming into sliding contact with an edge portion of the holder side annular groove 90 in the holder side opposing part 84. In this manner, the posture of the retainer 152 is maintained and thus when the balls 151 roll, the retainer 152 rotates at the periphery of the axis L concurrently with rolling of the balls 151 without a backlash of the retainer 152. Therefore, the holder 5 rotates smoothly.

Further, the retainer 152 has the cutout parts 152*a* in two locations that are respectively spaced from each other in the outer circumferential edge. Therefore, the retainer 152 is held by a jig or the like via the cutout parts 152*a* to be thereby able to determine the posture (angular location) of the retainer 152 at the periphery of the axis L. Accordingly, the rolling members such as the balls 151 can be easily disposed in the through holes 153 of the retainer 152.

In addition, in the present embodiment, lubricating oil is applied to the inner circumferential faces of the fixing member side annular groove 56 and the holder side annular groove 90 and thus the holder 5 rotates smoothly relative to the fixing member 8. Here, between the fixing member side opposing part 55 and the holder side opposing part 84, the Labyrinth seal is configured with: the annular projection part 157 that is provided in the fixing member side opposing part 55; and the annular stepped part 158 that is provided in the holder side opposing part 84. Therefore, the entry of dust getting into a gap between the fixing member side opposing part 55 and the holder side opposing part 84 is prevented or restricted. Further, the annular projection part 157 projects from the fixing member side opposing part 55 toward the holder side opposing part 84, and the annular stepped part 158 is provided in the holder side opposing part 84. As a result, an aperture of the Labyrinth seal is provided in a location that is spaced from an end on the side in the +Z direction of the mirror cylinder member 106. Therefore, even in a case where volatile gas of the lubricating oil flows out via the Labyrinth seal, it may be possible to restrict an adverse influence on the optical element 2.

Further, in the present embodiment, the holder 5 is rotatably supported at the periphery of the axis L by the first rotation supporting mechanism 6 and the second rotation supporting mechanism 7 that are respectively spaced from each other in the Z axis direction. Therefore, the rotary shaft of the holder 5 does not vibrate. Furthermore, the plate spring 25 of the fixing member 8 applies the given pressure that is oriented in the +Z direction to the ball bearing 68 (outer ring 68*a*) via the movable holder 26 and thus rotation of the holder 5 that is supported by the second rotation supporting mechanism 7 can be stabilized. Still furthermore, the plate spring 25 of the fixing member 8 is configured to bias the holder 5 toward the fixing member side opposing part 55 of the fixing member 8 (object side casing 29) via the movable holder 26 and the outer ring 68*a*. That is, the plate spring 25 applies the given pressure that is oriented in the +Z direction to the first rotation supporting mechanism 6. In this manner, the holder side opposing part 84 and the fixing member side opposing part 55 are not spaced from each other in the Z axis direction and thus the balls 68*c* that are held by the retainer 152 do not slip off from a gap between the holder side annular groove 90 of the holder side opposing part 84 and the fixing member side annular groove 56 of the fixing member side opposing part 55, and the holder 5 rotates smoothly relative to the fixing member 8.

In addition, in the present embodiment, the object side casing 29 (fixing member side opposing part 55) and the holder 5 (holder side opposing part 84) are formed of a resin material. Therefore, these constituent elements can be reduced in weight in comparison with a case in which they are formed of a metal material. Further, the object side casing 29 (fixing member side opposing part 55) and the holder 5 (holder side opposing part 84) are formed of a same resin material and thus these members has the same thermal expansion rate. Therefore, even in a case where the optical unit 1 with shake correction function has been operated under a temperature changing environment, unstable rotation of the holder 5 can be prevented.

Modification Example

Incidentally, the swing driving coil 13 and the swing driving magnet 14 can be exchanged from each other in layout. That is, the swing driving coil 13 may be held by the fixing member 8, and the swing driving magnet 14 may be held by the movable member 3. Also, the rolling driving coil 15 and the rolling driving magnet 16 can be exchanged from each other in layout. That is, the rolling driving coil 15 may be held by the fixing member 8, and the rolling driving magnet 16 may be held by the holder 5.

In addition, the rolling driving coil 15 and the rolling driving magnet 16 can be caused to oppose to each other in the radial direction. In this case, for example, it is sufficient if either one of the rolling driving coil 15 and the rolling driving magnet 16 is held by the longitudinal frame part 87 of the holder main body member 81, and the other one is disposed in a location that is capable of opposing to such either one of the rolling driving coil 15 and the rolling driving magnet 16 in the inner circumferential face of the cylindrical casing 28 of the fixing member 8.

Further, the annular projection part 157 that projects in the +Z direction is provided in the holder side opposing part 84, and the annular stepped part 158 that receives the annular projection part is provided in the fixing member side opposing part 55 to be thereby able to configure the Labyrinth seal.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with shake correction function, the optical unit comprising:

an optical module configured to hold an optical element;

a swingable supporting mechanism configured to swingably support the optical module between a reference position in which a preset axis of the optical module and an optical axis of the optical module are coincident with each other and a tilt position in which the optical axis tilts relative to the preset axis;

a supporting member configured to support the optical module on an inner circumferential side via the swingable supporting mechanism;

a rotation supporting mechanism configured to rotatably support the supporting member around the preset axis;

a fixing member configured to support the supporting member via the rotation supporting mechanism;

a swing magnetic driving mechanism configured to swing the optical module via the swingable supporting mechanism;

a rolling magnetic driving mechanism configured to rotate the supporting member via the rotation supporting mechanism; and a second rotation supporting mechanism configured to rotatably support the supporting member around the preset axis in a location that is spaced from the rotation supporting mechanism in a direction of the preset axis, wherein the fixing member comprises a fixing member side opposing part that opposes the supporting member in the direction of the preset axis, the supporting member comprises a first supporting member side opposing part that opposes the fixing member side opposing part in the direction of the preset axis, the rotation supporting mechanism comprises a plurality of rolling members between the fixing member side opposing part and the first supporting member side opposing part, the fixing member further comprises:
 a fixing member main body comprising the fixing member side opposing part;
 a spring member that is fixed to the fixing member main body; and
 a movable holder that is supported by the fixing member main body, the movable holder being movable in the direction of the preset axis, the movable holder opposes to the supporting member from an opposite side to the fixing member side opposing part, the supporting member further comprises a second supporting member side opposing part that opposes to the movable holder, the second rotation supporting mechanism comprises:
 an inner ring that is coaxial to the preset axis, the inner ring being held by the second supporting member side opposing part;
 an outer ring that is disposed on an outer circumferential side of the inner ring, the outer ring being held by the movable holder; and
 a ball that rolls between the inner ring and the outer ring, and the spring member is configured to bias the movable holder toward the second supporting member side opposing part in the direction of the preset axis so that the supporting member is biased in the direction of the preset axis via the movable holder and the outer ring and thereby, the first supporting member side opposing part provided in the supporting member is biased by the spring member toward the fixing member side opposing part so that the plurality of the rolling members are held between the fixing member side opposing part and the first supporting member side opposing part.

2. The optical unit with shake correction function according to claim 1, wherein
the fixing member side opposing part is formed in an annular shape, and is positioned at an outer circumferential side of the optical module,
the fixing member side opposing part comprises a fixing member side annular groove that surrounds the preset axis;
the first supporting member side opposing part comprises a supporting member side annular groove that opposes to the fixing member side annular groove, and
the rolling members are respectively inserted into the fixing member side annular groove and the supporting member side annular groove.

3. The optical unit with shake correction function according to claim 2, wherein
the rotation supporting mechanism comprises an annular retainer that surrounds the preset axis between the fixing member side opposing part and the supporting member side opposing part,
the retainer comprises a plurality of through holes that are arranged in a circumferential direction, and
a respective one of the plurality of rolling members is inserted into a respective one of the plurality of through holes.

4. The optical unit with shake correction function according to claim 3, wherein
the retainer comprises a first projection part that projects toward the fixing member side opposing part and a second projection part that projects toward the supporting side opposing part between two of the through holes that are respectively adjacent to each other in the circumferential direction,
the first projection part is configured to come into sliding contact with an edge portion of the fixing member side annular groove in the fixing member side opposing part, and
the second projection part is configured to come into sliding contact with an edge portion of the supporting member side annular groove in the first supporting member side opposing part.

5. The optical unit with shake correction function according to claim 3, wherein the retainer comprises cutout parts in two spaced locations of an outer circumferential edge.

6. The optical unit with shake correction function according to claim 2, wherein
lubricating oil is applied to inner circumferential faces of the fixing member side annular groove and the supporting member side annular groove,
in either one of an end portion on an inner circumferential side with respect to the fixing member side annular groove in the fixing member side opposing part and an edge portion on an inner circumferential side with respect to the supporting member side annular groove in the first supporting member side opposing part, an annular projection part that projects toward another one in the direction of the preset axis is provided, and in said another side, an annular stepped part that depresses in the direction of the preset axis, the annular stepped part being configured to receive a tip end portion of the annular projection part, is provided, and
the annular stepped part comprises:
 an annular radial opposing face that opposes from an outer circumferential side to a tip end portion of the annular projection part; and an annular axial opposing face that opposes in the direction of the preset axis to the tip end portion of the annular projection part.

7. The optical unit with shake correction function according to claim 6, wherein
the optical module comprises a mirror cylinder configured to hold the optical element,
an end on an object side of the mirror cylinder is positioned on a side of the fixing member side opposing part with respect to the supporting side opposing part in the direction of the preset axis,
the annular projection part projects from the fixing member side opposing part toward the first supporting member side opposing part, and
the annular stepped part is provided in the first supporting member side opposing part.

8. The optical unit with shake correction function according to claim 1, wherein the rolling magnetic driving mechanism comprises:

a rolling driving magnet that is disposed in either one of the supporting member and the fixing member; and
a rolling driving coil that is disposed in another one, the rolling driving coil opposing to the rolling driving magnet.

9. The optical unit with shake correction function according to claim 8, wherein the rolling driving magnet and the rolling driving coil respectively oppose to each other in the direction of the preset axis.

10. The optical unit with shake correction function according to claim 8, wherein the rolling driving magnet and the rolling driving coil respectively oppose to each other in a direction crossing the preset axis.

11. The optical unit with shake correction function according to claim 1, wherein the fixing member side opposing part and the first supporting member side opposing part are made of a same resin material.

* * * * *